US005659792A

United States Patent [19]
Walmsley

[11] Patent Number: 5,659,792
[45] Date of Patent: Aug. 19, 1997

[54] STORYBOARD SYSTEM FOR THE SIMULTANEOUS TIMING OF MULTIPLE INDEPENDENT VIDEO ANIMATION CLIPS

[75] Inventor: Simon Robert Walmsley, Epping, Australia

[73] Assignees: Canon Information Systems Research Australia Pty Ltd., North Ryde, Australia; Canon Inc., Tokyo, Japan

[21] Appl. No.: 181,247

[22] Filed: Jan. 13, 1994

[30] Foreign Application Priority Data

Jan. 15, 1993 [AU] Australia ............................. PL6835

[51] Int. Cl.$^6$ .............................................. G06F 17/00
[52] U.S. Cl. ................................. 395/807; 395/764
[58] Field of Search ............................. 395/152–154, 395/155–161, 762, 764, 765, 806, 807

[56] References Cited

U.S. PATENT DOCUMENTS

| | | | |
|---|---|---|---|
| 4,893,256 | 1/1990 | Rutherfoord et al. | 395/154 |
| 5,119,474 | 6/1992 | Beitel et al. | 395/807 |
| 5,274,758 | 12/1993 | Beitel et al. | 395/807 |

OTHER PUBLICATIONS

Director Version 3.1 for Macintosh Studio Manual, Macromedia, Inc., pp. 1–21 Jan. 1991.
MacroMind MediaMaker Users Guide, MacroMind, Inc., pp. 137–157 Jan. 1990.

Yoneda et al., "Constructing a System Using Time Dependent Multimedia Document", *11th Annual Int'l Phoenix Conf. on Computers and Communications*, Apr. 1, 1992, pp. 140–147.

Yoneda et al., "A New Communication Tool: Time Dependent Multimedia Document", *12th Int'l Conf. on Distributed Computing Systems*, Jun. 12, 1992, pp. 90–97.

*Primary Examiner*—Heather R. Herndon
*Assistant Examiner*—Joseph R. Burwell
*Attorney, Agent, or Firm*—Fitzpatrick, Cella, Harper & Scinto

[57] ABSTRACT

An automated storyboard system, which is updated for the creation of information sequences. The storyboard includes an array of cells arranged in columns, with the content of each cell indicating an information source having a certain active duration. For each column of the storyboard which contains active cells a determination is made as to which of the cells contains an information source having a shortest one of the active durations. The column is marked to have a column time duration of the cell of shortest active duration, with the cell of the shortest active duration being terminated at the end of the column. When other active cells exist for the column, a further column is added next to the column, with the further column containing the other active cells. The active cells have an updated active duration which is equal to their previous active duration less the column time duration.

10 Claims, 8 Drawing Sheets

15

| ROMStoryboard |
| #ClipsPlaying |
| #UnresolvedClips |
| #UnresolvedExternals |
| MaxRows |
| MaxColumns |
| Current Column |
| ColumnTable |
| # ClipMarkers |
| ClipMarkerTable |
| RowTable |

| Cells |
| # ClipMarkers |

| ComponentCount |

*Fig. 16*

STORYBOARD SYSTEM FOR THE SIMULTANEOUS TIMING OF MULTIPLE INDEPENDENT VIDEO ANIMATION CLIPS

FIELD OF THE INVENTION

The present invention relates to the display of video animation and in particular, the editing of video segments to produce a multilevel simultaneous display of multiple video clips.

BACKGROUND ART

Traditional film production techniques usually involve the shooting of multiple video or film 'takes' or 'clips'. Normally much more film is shot than is required for the final result. The resultant film is normally edited by a film editor who uses scissor like splicers and adhesive tape to cut and paste together the desired shots. Artistic decisions about the selection of shots to enhance the performance are made and a final result produced.

If dissolves or wipes are required between two sources, then the processing becomes much more complicated, often involving the use of multiple video recorders and vision switchers.

Although editing and mixing can be implemented on a frame by frame basis, it is desirable to be able to format the editing/production process with what is known in the industry as a "storyboard". The storyboard represents a plan of the film video or animation that is to be created as assists in the visualisation of the production. Storyboards are traditionally created by hand, going through many interactions and revisions during production and is basically a chart of various sources of audio/video and how they are to be combined over time to produce the final film. Furthermore, as a director, or the like may wish to alter the production once an initial storyboard has been created, it is highly desirable that the storyboard itself be readily editable.

Recently, computer systems have been introduced which go part of the way to automate this process. Typically, these systems require animations to be created on a frame by frame basis, storing each frame on a disk, with the image being played back at a later date by reading each frame from the disk and displaying it on a computer screen or the like.

Recently, in Australian Patent Application No. 38238/93, entitled "An Audio and Video Processor System", claiming priority from Australian Provisional Patent No. PL2141 filed 29th Apr., 1992, and to which U.S. patent application Ser. No. 08/053,569 corresponds, now U.S. Pat. No. 5,590,252, the contents of which are hereby incorporated by cross-reference, a video animation system was proposed that was capable to producing real-time video animation through the use of real-time object (RTO) technology. That document, and other co-related documents describe apparatus that can perform audio and video mixing, editing, sampling, and the like at a substantially reduced cost with respect to prior art arrangements. For a discussion of RTO technology, refer to Australian Patent Application No. 38244/93, entitled "A Real-Time Object Based Graphics System" claiming priority from Australian Provisional Patent No. PL2147, filed 29th Apr., 1992, and to which U.S. patent application Ser. No. 08/053,373 corresponds, now U.S. Pat. No. 5,444,839, the contents of which are hereby incorporated by cross-reference.

As a result of these developments, there is an ever increasing need for an automated storyboard system capable of editing, ordering and timing multiple clips for subsequent display.

It is an object of the present invention to provide an automated storyboard mechanism which substantially meets these needs.

SUMMARY OF THE INVENTION

In accordance with one aspect of the present invention there is provided a method for updating an automated storyboard system for the creation of information sequences, wherein said storyboard comprises an array of cells arranged into columns, in which the contents of each cell indicates an information source having a certain active duration, the method comprising, for each column of the storyboard which contains active clips, the storyboard calculation steps of:

determining which cell contains an information source having the shortest active duration, marking the current column to have a column time duration of said cell of shortest active duration and terminating said cell of shortest active duration at the end of the current column, and where other active cells exist for a current column, adding a column next to the current column and containing said other active cells with the active cells having an updated active duration of their previous active duration less said column time duration.

Preferably the method for updating an automated storyboard system further includes providing a means for terminating a multiplicity of cells at substantially the same time comprising the steps of:

identifying in which cell of a storyboard that a second cell terminates;

designating a first cell to stop in that cell, and adjusting the active duration of that cell to accord with the length of the second cell.

In accordance with other aspects of the present invention, there are provided various methods for automatically adding and moving clips within a storyboard.

The columns can have any number of cells either active or inactive therein, thereby allowing different animations to be simultaneously displayed at different priority levels above one another.

Apparatus for implementing the methods is also disclosed.

BRIEF DESCRIPTION OF THE DRAWINGS

A preferred embodiment of the present invention will now be described with reference to the accompanying drawings in which:

FIG. 14 illustrates a storyboard in RAM.

FIG. 15 illustrates an entry in the column table.

FIG. 16 illustrates a RowTable entry.

DETAILED DESCRIPTION OF THE PREFERRED EMBODIMENT

The preferred embodiment of the present invention is designed to provide an automated storyboard mechanism capable of simultaneously editing, ordering and timing multiple video animation clips for subsequent display on an audio and video animation processor system (AVAPS) such as that disclosed in the above mentioned patent application.

Figure 1:
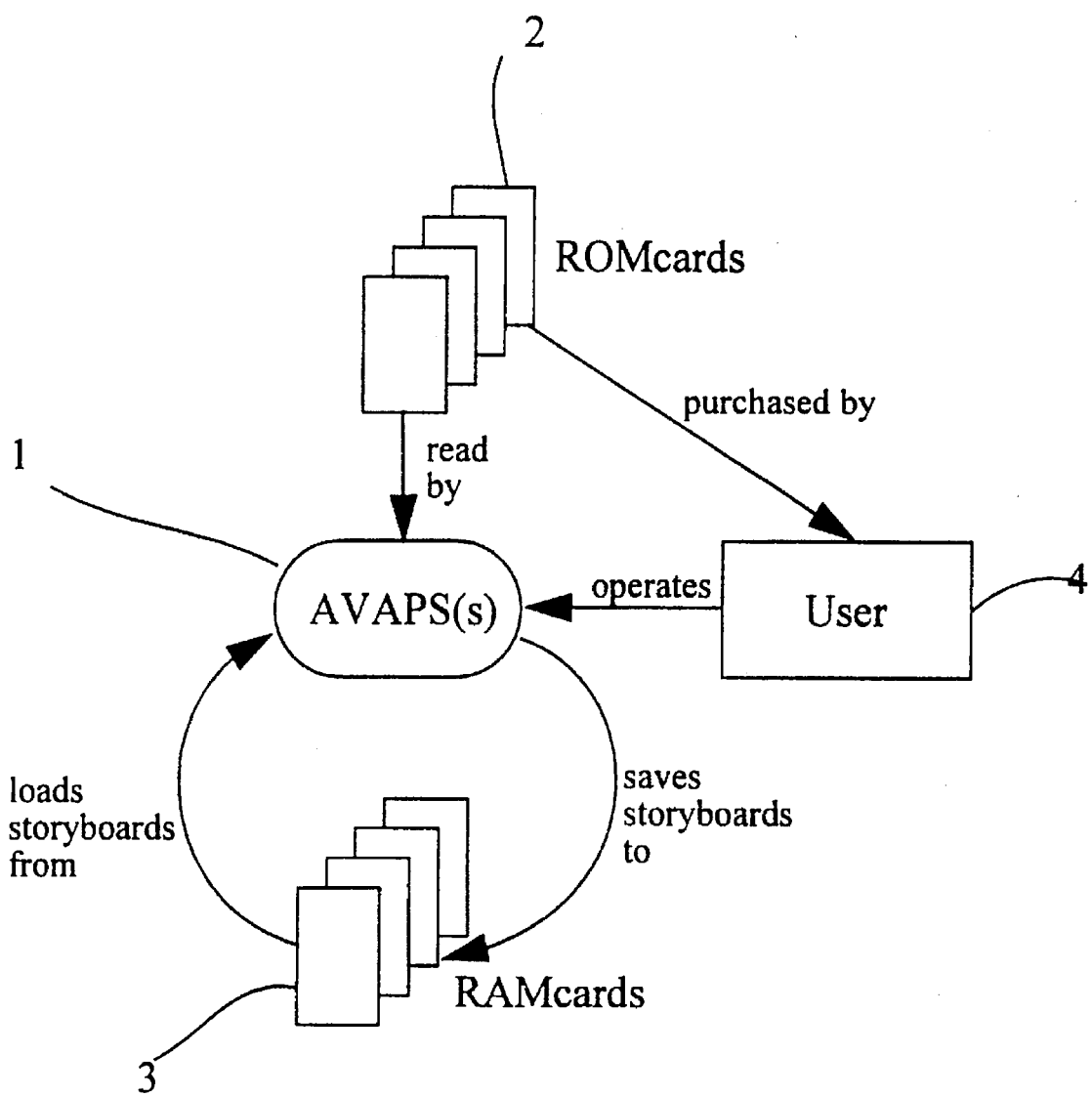
FIG. 1 illustrates an AVAPS system and its operational environment.

Referring now to FIG. 1 there is shown an AVAPS 1 and its operational environment. Users purchase ROMcards 2, and operate the AVAPS 1 to sequence clips from the ROM cards into storyboards. Storyboards are played on one or many AVAPS's. Users 4 can edit and save their sequenced clips (storyboards) onto RAMcards 3 for future use.

Figure 2:
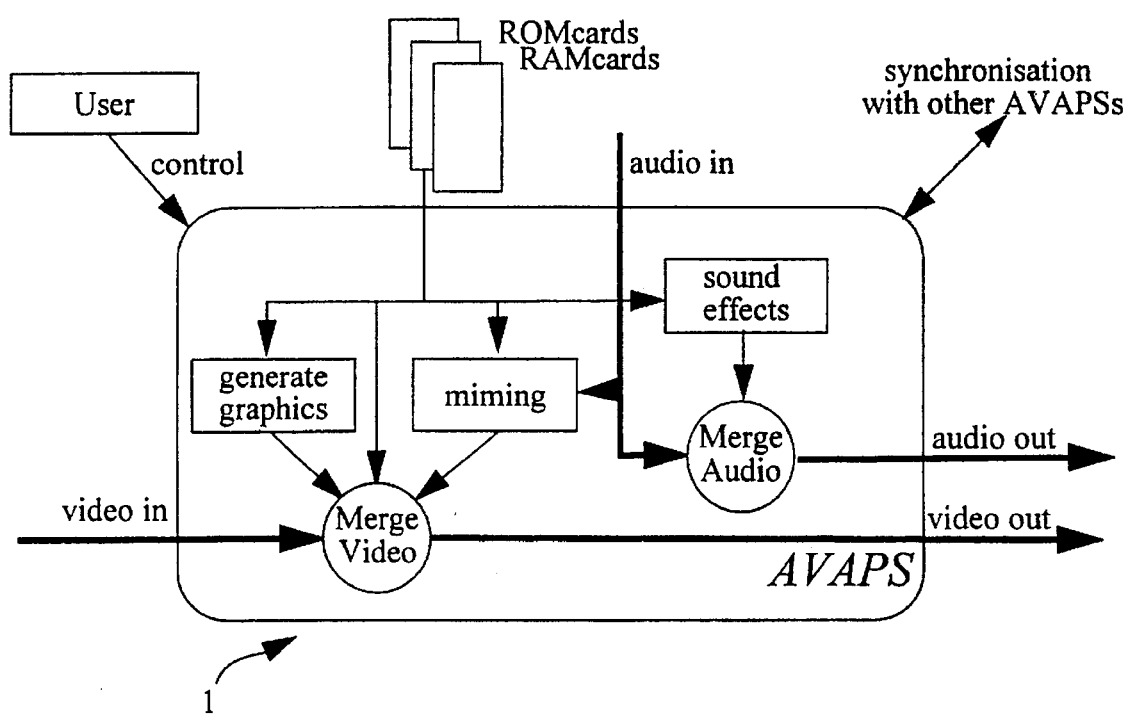
FIG. 2 illustrates the AVAPS system of FIG. 1 in more detail.

Referring now to FIG. 2 there is shown the AVAPS 1 in more detail. When playing a storyboard, the AVAPS generates graphics and selects shapes for miming based on audio input. These generated images are merged in a controlled manner with an incoming video signal, producing an output video signal. Sound effects are also generated, merged with the input audio signal and leave the AVAPS 1 in the form of audio out. Limited run-time animation control can be provided by the user, and a limited amount of synchronisation can occur with other AVAPS's.

Those skilled in the art will appreciate that in other embodiments, the AVAPS 1 can include a laser-disc or another form of CD-ROM which can substitute for, or supplement the operation of the ROMcards 1 of FIG. 1 and FIG. 2, which are provided for a substantially portable AVAPS. Similar alternatives apply to the RAMcards 3 which can be supplemented by an integral RAM or hard/floppydisc drives.

The overriding emphasis in the AVAPS 1 is on giving the user easy access to sophisticated but canned (preformatted and recorded) animations, which the user can modify in simple ways and combine to achieve the desired effect.

A clip is a predesigned 'canned' animation component that usually contains graphics and sound. However, those skilled in the art will appreciate that a clip can comprise only sound information, or visual information. The former would be used for preparing an audio recording or soundtrack, for example. The latter could be used to create a "silent film". A clip with visual information is capable of manipulating shapes, position, size, and color and synchronising with the user (e.g. by means of a keypress). The preferred embodiment to be described relates to clips with both sound and visual information.

Clips can contain user-editable components (such as editable text) and fixed (non-editable) components. The author of the clip can specify defaults for all of the user-editable components, so that a clip can be used without any customization.

Each clip provided by the author has a duration type. The type is one of:

fixed, where the clip can determine its duration without outside constraints (i.e. by examining its own components). For example, a clip may show scrolling credits at a constant speed. The number of lines of text to scroll will determine the duration of the clip.

unknown, where the clip has no idea of its duration, nor can it easily be determined. For example, if a clip waits for the user to press a key, the clip will not know ahead of play-time how long it will be before the user presses the key.

infinite, where the clip has no duration limit, and will be displayed for as long as the user wishes it to. An example of this is a background image behind some sequenced animation. The background image should be displayed as long as necessary in theanimation. Typically, a clip with infinite duration will need to be tied to the duration of another clip. For instance, a background image should be tied to last as long as the scrolling credit clip lasts.

The preferred embodiment of a storyboard system is configured to allow a user to:

select a clip from a ROMcard;

edit those components of a clip that are editable;

play a clip; and sequence, layer and synchronize multiple clips.

For the purposes of the preferred embodiment, the user can decide to combine clips into a storyboard. The storyboard represents the display order and sequence of the clips. It indicates which clips are run together, what dependencies they have on their starting and finishing times, and what display order in terms of relative visual priority each clip has.

Figure 3:
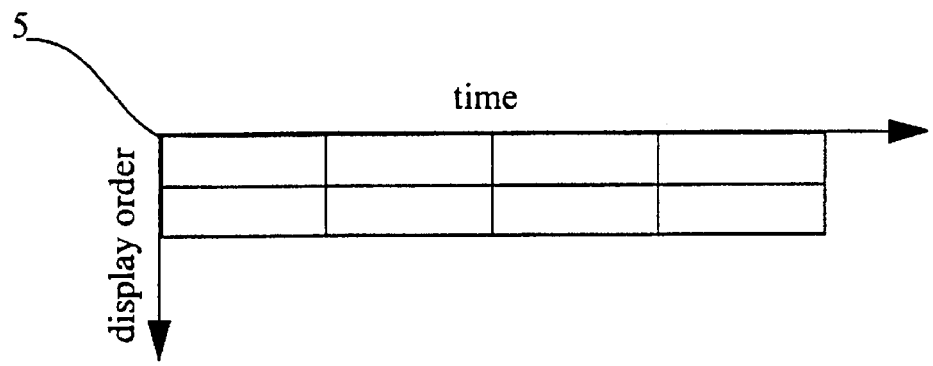
FIG. 3 illustrates a simple storyboard containing 4 columns, two rows, and therefore 8 cells.

Consequently a storyboard represents:

time order. This includes representing clips that run in parallel (clip A runs at the same time as clip B), and sequence (clip A follows clip B)

display order. This includes representing the relative display order priorities of clips that are active at the same time (clip A should be displayed above clip B)

synchronization. This includes starting and stopping clips together (clip A should terminate when clip B terminates) as well as clip markers for random access during playback FIG. 3 illustrates that a storyboard is conceptually like a spreadsheet, with rows, columns, and cells. Consecutive columns represent consecutive time segments, and rows represent display order within a time segment. Both dimensions are relative rather than absolute. Thus each column may represent a different length of time.

A storyboard is read from left to right, one column at a time. Each column represents one time segment, and the cells in each column represent relative display levels during that time segment.

Each cell within a column may contain one of the following items:

nothing. If a cell contains nothing, it means that there is nothing of consequence happening during that time segment on that relative display level.

a clip. If a cell contains a clip, it means that the clip starts at the beginning of the cell's time segment at that cell's relative display level.

a continuation marker. If a cell contains a continuation marker, it means that the clip that began in an earlier time segment on this same row is continuing through this cell's time segment.

Each cell also has a stopped flag, which indicates if the clip is to be forced to stop at the end of that cell's time segment.

The length of time represented by a particular column is defined to be the minimum time of all cells in that column. All clips that are in a particular column are defined to start together. Their finishing times will vary depending on the length of each clip. The length of the column will therefore be the length of the shortest clip. All other clips will then continue into the next column (or time segment) via a continuation marker. The length of the next column will be the shortest of all remaining times for each clip and any new clips that have started in that column. For the purposes of calculating a minimum time, an unknown duration is treated as zero time, and an infinite duration is treated as infinite.

The continuation markers are automatically added and removed by the AVAPS storyboard system, and therefore the number of columns that exist in a storyboard can change dynamically based on the number of time segments that are required to represent the clips.

A clip can be terminated prematurely by setting a stopped flag in a cell. This can be accomplished directly (e.g. by changing the stopped flag explicitly), or indirectly (e.g. by starting another clip where a continuation marker was previously). In either case, the clip will then terminate at the end of the column, regardless of how much time was remaining on that clip.

Storyboards also contain user-defined clip markers. Each column can have a clip marker associated with it provided there is at least one clip in that column. The clip marker refers to all clips that begin in the column.

Given the above representation of a storyboard, it is possible to interpret the meaning of a given storyboard.

Figure 4:
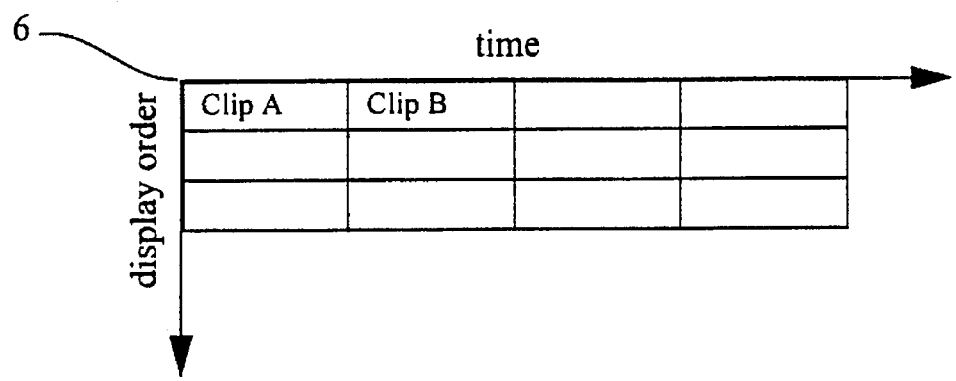
FIG. 4 illustrates a storyboard having two clips in sequence.

Referring now to FIG. 4 there is shown a storyboard 6 having the same two clips in sequence, clip A and clip B. The first column is of length clip A, and the length of the second column is of length clip B. Consequently clip A is run first, then clip B is run when clip A has finished. This is true regardless of the length of A or B. If clip A had an unknown duration, then clip B would be run only when clip A finished (however long that was). If clip A had an infinite duration, then clip B would never be run, as clip A would never terminate.

Figure 5:
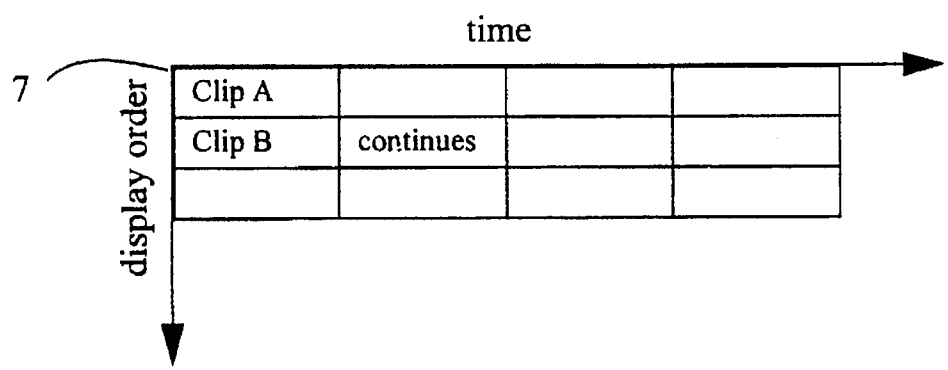
FIG. 5 illustrates a storyboard having two clips in parallel.

Referring now to FIG. 5 there is shown a storyboard 7 having the same two clips in a parallel. The first column has the two clips, so its length is that of the shortest of the two clips (i.e. clip A). As clip A has finished by the end of the first time-segment, it does not continue to the next time-segment. Consequently, the second column has a continuation marker in the cell of the same row that clip B was in, to indicate that it continues to the next time-segment. The minimum time of the clips active in this second time-segment is the time (clip B-clip A). The relative display order of the two clips is apparent from the storyboard. Clip A is displayed on a higher priority than clip B, therefore when rendering the storyboard, if an object from clip A is drawn overlapping an object from clip B, the viewer will see the object from clip A on-top-of the object from clip B.

The first column represents the starting time of the animation, the second column represents the time when clip A has finished (and B is continuing), and the third column represents the time when clip B has finished.

Figure 6:
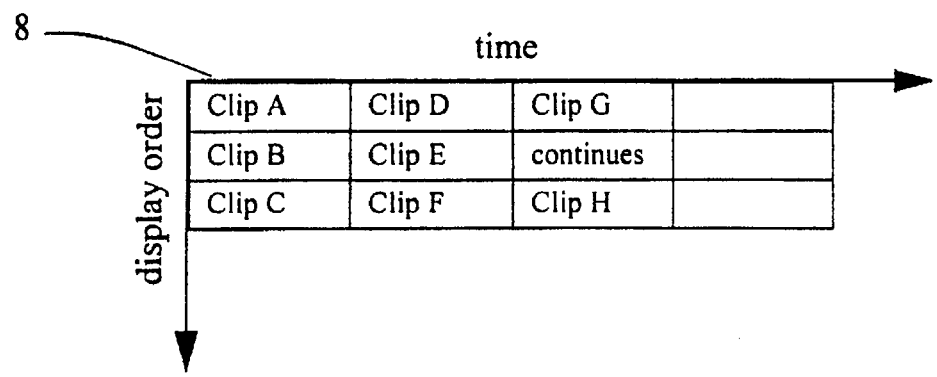
FIG. 6 illustrates a storyboard example that could be used for a presentation describing the uses of a particular product in two countries.

Referring now to FIG. 6 there is shown a storyboard example 8 that could be used for a presentation describing the uses of a particular product in two countries. Clips A, B, and C (the first column) may represent the animated company logo and title. Clip D may represent the text describing the product's use in the first country, while clip G may represent the text describing the product's use in the second country. Clip E represents the graphics of the product itself, while clips F and H represent the graphical maps of the two countries.

The first column contains clips A, B, and C. If clips A and B have their stopped flags set, they will both terminate when clip C terminates, i.e. the animated title and logo will be on the screen for the duration of the delay clip C.

The second column shows that clips D, E, and F are started simultaneously when clips A, B, and C terminate. Clip F is terminated by the shortest clip in the column (clip D), and clip E continues after clips D and F are terminated.

The third column shows that clips G and H start when D and F terminate, and finally all clips terminate when clip G finishes.

A storyboard is changed by performing actions on cells and columns in the storyboard. Each action affects the cell, and then the storyboard is re-evaluated. Effectively, the minimum time for the cell's column is recalculated, and this calculation is propagated as far as required.

The following actions can be performed on cells in the storyboard:

place a clip in a cell;

delete a clip from a cell;

change the stopped flag of a cell;

edit a clip; and insert a clip between cells.

The effect on storyboard for each of these actions is described in the table below:

| Cell contains | Place clip in cell | Delete contents of cell | Change stopped flag | Edit cell |
|---|---|---|---|---|
| nothing | change cell to new clip, set time = clip's duration, clear stopped flag | not meaningful, leave cell as nothing | not meaningful leave flag clear | not meaningful |
| clip | preserve changed data from old clip to new clip, change cell to new clip, set time = clip's duration, preserve stopped flag | change cell to nothing, set time = 0, clear stopped flag | change flag | set time = clip's duration |
| continuation | set stopped flag in previous cell in same row, change cell to new clip, set time = clip's duration, preserve stopped flag | not meaningful, leave cell as continuation | change flag | not meaningful |

The other action of inserting a clip between cells, is implemented by one of two actions:

if inserting between two columns, add a column containing nothings and the clip (all clear stopped flags); or if inserting between rows, add a row containing nothings and the clip (all clear stopped flags).

Once an action has been performed on a particular cell within a column, the storyboard must be changed to reflect the changes to the cell. Effectively, the minimum time for the column needs to be recalculated, and the effects propagated as far as necessary throughout the storyboard.

The structure of a computer program in pseudo code implementing the process for recalculating is as follows:

```
while not finished
    recalculate column
    if column changed during recalculation
        advance to next column
    else
        finished
```

The Pseudo-Code for recalculating a column is as follows:

```
set minimum time of column to be infinity
for each cell in column
    recalculate cell
    adjust minimum time of column
for each cell of column
    set time = time − minimum time of column
if entire column is full of nothings
    delete column
```

Recalculating a cell is based on the time remaining for the cell in the previous column on the same row. This time is called t. Eventually, a time will be calculated for the time remaining in the current column. This will be the t for use in calculating the next column.

The following table shows the actions to perform in order to recalculate a particular cell.

| Cell type | t ≦ 0 | t > 0 |
| --- | --- | --- |
| nothing | leave cell as nothing | change cell to continuation marker with clear stopped flag, set time = t, update minimum time (m) for column |
| clip | leave cell as clip with original stopped flag, leave time as clip's duration, update minimum time (m) for column | insert new column of nothings, re-evaluate from new column |
| continuation marker | change cell to nothing, set time = 0 | leave cell as continuation marker with original stopped flag, set time = t, update minimum time (m) for column |

The only way a cell can change (apart from a user action on a cell) is for a cell in the previous column to change. Therefore, if a column has not changed, then no subsequent columns will change.

A storyboard may be played. Playing involves rendering each of the clips in a column for the specified duration, and then stopping or continuing the clip based upon the next column. For a full discussion of the rendering of a storyboard, the reader is referred to Australian Patent Application No. 53188/94 claiming priority form Australian Patent Application No. PL6833 filed 15 Jan. 1993 and entitled "Render System for rendering of Storyboard Structures on a Real-Time Animation System", and to which U.S. patent application Ser. No. 08/181,246 corresponds, the disclosure of which is hereby incorporated by cross-reference.

Each storyboard incorporates a number of data structures and corresponding programs which are initially stored on ROM and RAM cards before being loaded into the AVAPS 1. The data structures are then manipulated by programs run on the AVAPS 1 under the command and control of the user. The various data structures utilized by the user will now be described with reference to FIG. 7 to FIG. 17.

Figure 7:
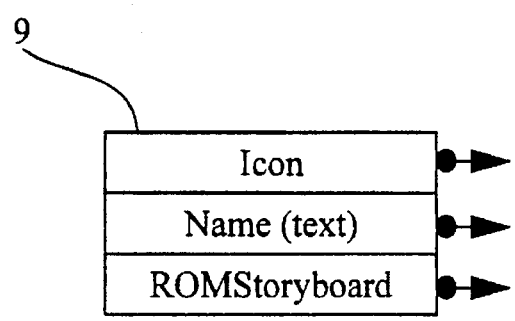
FIG. 7 illustrates a storyboard directory entry.

Referring now to FIG. 7 there is shown a storyboard directory entry 9. Each storyboard has an entry in the Storyboard Directory either on a ROM card or a RAM card containing at least the following information:

Icon is a pointer to the icon for a particular storyboard. Since storyboards normally may have no visible icons in the user-interface, this value can be NULL;

Name is a pointer to the name for the storyboard. This is a textual description of the storyboard, and will have a maximum size associated with it (imposed implicitly by the AVAPS 1). A fixed amount of space is allocated for RAM card storyboard name storage to enable renaming of storyboards without fragmentation of the RAMcard; and ROMStoryboard is a pointer to a ROMStoryboard structure.

Figure 8:
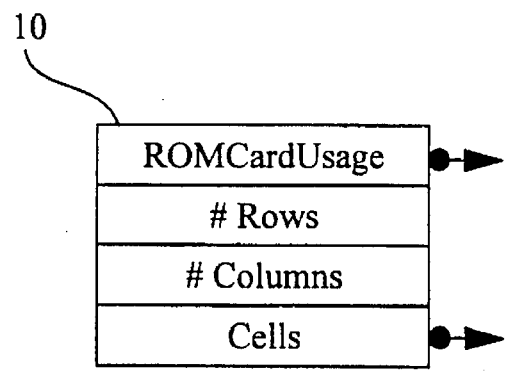
FIG. 8 illustrates a ROM storyboard structure.

Referring now to FIG. 8 there is shown a ROM storyboard structure 10. The storyboard structure is a means of accessing the various components that make up a storyboard. Each storyboard saved to a ROMcard has this structure. Storyboards in RAM also have this structure, with some additional information added to increase access speed. In particular:

ROMCardUsage is a pointer to the first element in a linked list indicating status information about the ROM cards used by the storyboard. This linked list is known as a ROMCard Usage Table;

Rows indicates the number of active rows in the storyboard;

Columns indicates how many active columns are in the storyboard; and

Cells is a pointer to the storyboard's cells, stored contiguously a column at a time.

Figure 9:
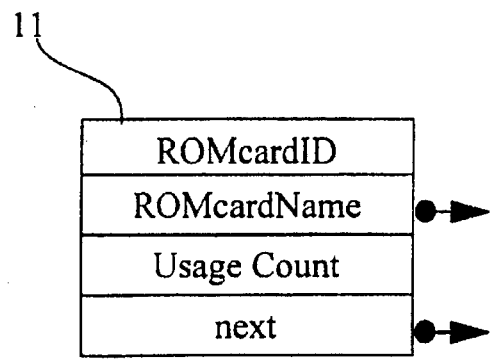
FIG. 9 illustrates a ROMCard Usage Table.

Referring now to FIG. 9 there is shown the ROMCard Usage Table. It is important to keep track of which ROMcards are used by a storyboard. The ROMCard usage table record keeps track of this information, as well as where the ROMcard is in the AVAPS memory. The information stored in the ROMcard usage table is as follows:

ROMcardID is the identification (ID) associated with a particular ROMcard that makes it unique;

ROMcardname points to a text string defining the name of the ROMcard. This is useful when prompting the user for a particular card, where the name of the ROMcard has more meaning to the user rather than the ID;

UsageCount indicates how many clips and editable local variable block (LVB) entries reference a particular ROMcard; and Next is the address of the next ROMcard Usage entry in this Storyboard. A NULL pointer indicates that there are no further ROMcards used.

Figure 10:
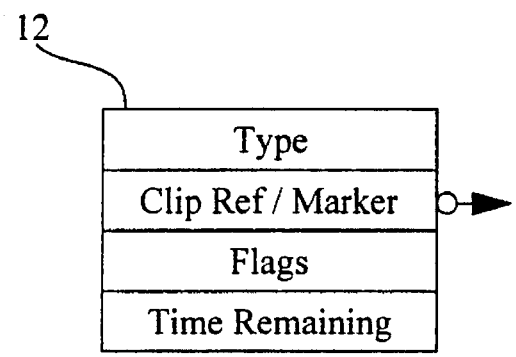
FIG. 10 illustrates a Cell structure.
Figure 11:
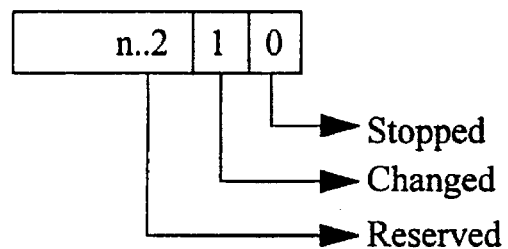
FIG. 11 illustrates the structure of the flag entry in a cell.

Referring now to FIG. 10 there is shown a cell structure 12. A column consists of an array of cells. Each cell includes the following information:

Type may be one of the following: Empty, ClipReference, and ContinuationMarker;

Clip Ref Marker is NULL when the Type=Empty. It is a pointer to a Clip Reference when the Type= ClipReference or ContinuationMarker;

TimeRemaining indicates how much time is remaining for an active clip after this cell has completed;

Flags is a set of booleans. The structure of this record can be found in FIG. 11 and includes a Stopped flag and a Changed flag in addition to a number of reserved flags for future use; The Stopped flag, when set, signifies that the clip to terminate when the cell's column terminates;

The Changed flag is used internally by a Storyboard Manager to maintain what cells of a storyboard have changed since the last evaluation; The unused reserved bits should be set to 0.

Figure 12:
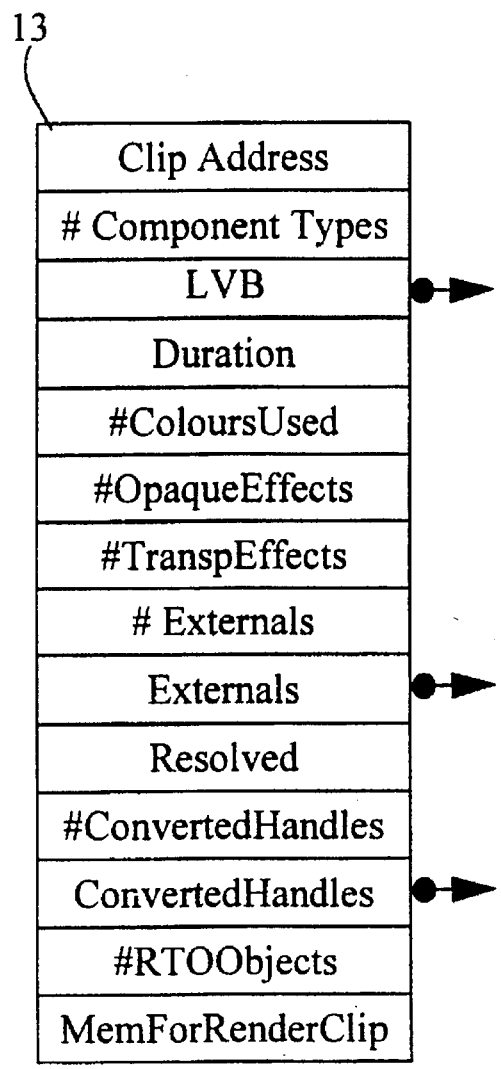
FIG. 12 illustrates a clip reference pointed to by a cell in a storyboard.

Referring now to FIG. 12 there is shown a clip reference pointed to by a cell in a storyboard. A clip reference 13 contains the following information:

ClipAddress is the address pointed to by the ClipRef/ Marker as shown in FIG. 10.

Component Types indicates how many editable component types a given clip has in its local variable block (LVB);

LVB points to the user LVB structure for the clip. Note that the LVB pointed to by this reference is a different LVB than the actual clip. The LVB contains the user editable portions of each clip.

Duration summarizes the duration of the clip in AVAPS time units;

ColorUsed summarizes how many color layers are required by the clip;

OpaqueEffects summarizes how many opaque effects are used by the clip;

TranspEffects summarizes how many transparent effects are used by the clip;

Externals indicates how many external variables are required by the clip;

Externals points to an array of externals. Instantiated externals are non-NULL;

Resolved indicates whether the clip reference is resolved or not. A resolved clip reference has all its components on loaded ROMcards, and can therefore be played;

Convertedhandles indicates how many non-primitive handles are in the clip;

ConvertedHandles is a pointer to a list of pointers to converted handles (e.g. a TextHandle would be converted to a GraphicHandle and stored via the ClipRef);

RTOObjects defines how many RTO objects are used by the clip; and

MemForRenderClip defines how much memory is required for the clip to be rendered. It includes two sets of MemForObjects.

Figure 13:
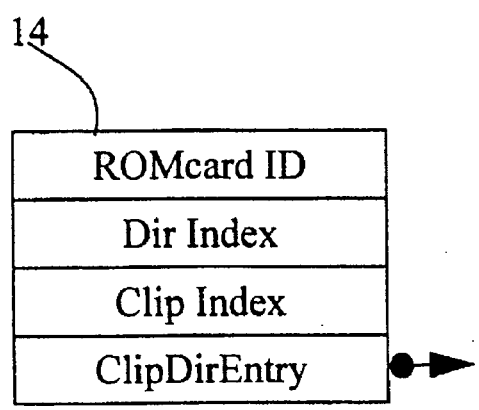
FIG. 13 illustrates a clip address.

Referring now to FIG. 13 there is shown a clip address 14. A clip address indicates where to find a particular clip. A clip address has the following structure:

ROMcardID indicates the ID (identity) of the ROMcard to use to find the particular clip;

Dir Index indicates which directory number within the particular ROMcard the clip can be found. This can also be used to determine which clip family the clip belongs to;

Clip Index indicates which entry number in the directory on the particular ROMcard should be used to access the clip; and ClipDirEntry points to the resolved directory entry structure on the ROM card where the clip is kept.

The storyboards, which reside on the RAMCards, are initially copied to the internal RAM of the AVAPS 1. Storyboards in RAM are maintained by the storyboard and associated data structures which are used in addition to the structures stored on the various memory cards.

Referring now to FIG. 14 there is shown a storyboard in RAM 15. When a storyboard is copied from ROM or RAMcard to RAM, additional information is kept to increase access speed to various components. The storyboard in RAM has the following structure:

ROMStoryboard is the base storyboard structure as described in FIG. 8;

ClipsPlaying indicates how many of the storyboard's clips are currently being played. A storyboard can only be modified while no clips are being played;

UnResolvedClips indicates how many of the clips in the storyboard are still unresolved—that is, they need a ROMcard to be inserted so that the clip can be played;

UnresolvedExternals indicates how many externals in the storyboard still require resolving before the storyboard can be played;

MaxRows indicates the maximum number of rows allocated for storyboard growth;

MaxColumns indicates the maximum number of columns allocated for storyboard growth;

CurrentColumn indicates the number of the current column either being played (if playing), or last played (if no longer playing);

ColumnTable points to a table detailing information about the cells of the storyboard in RAM. This is used instead of the cells components of a ROMStoryboard;

ClipMarkers indicates how many clip markers are currently in the storyboard;

ClipMarkerTable is a pointer to the table containing clip marker information; and RowTable is a pointer to the table containing row information.

A storyboard consists of a spreadsheet of columns and rows. Since the storyboard reorganises itself in terms of columns (which are added and deleted dynamically as previously described), the storyboard itself is kept in a column order. The column table indicates the current column order of the storyboard as an array of column pointers. Shuffling the order of columns in a storyboard, and inserting and deleting columns is simply a matter of shuffling entries in this table.

Referring now to FIG. 15 there is shown an entry in the column table 16. The number of valid entries in the ColumnTable is given by the #Columns value in the ROMStoryboard structure. The information provided is as follows:

Cells is a pointer to an array of cells for a particular column in the storyboard. The number of valid cells in a column is given by the #Rows value in the storyboard structure; and

ClipMarkers indicates how many clip markers are present in the column.

Referring now to FIG. 16 there is shown a RowTable entry 17. While a storyboard is being edited, the number of clips in each row is maintained. When a row between two non-empty rows becomes empty, then the empty row is deleted from the storyboard, and the remainder of the storyboard is shifted up to take the place of the deleted row. The RowTable contains the row information required to achieve this functionality. The Row Table is a table of RowTable Entries with the following information:

ComponentCount is the number of non-empty and non-continuation-marker cells in the row.

In order to manipulate storyboards within the AVAPS 1, operations are performed on the aforementioned data structures. These operations are implemented in software codes and include providing means for the automatic manipulation of elements of a storyboard, including the manipulation of clips within a storyboard and the automatic placement of continuation markers to reflect the changes in timing within the storyboard. The functions provided are as outlined in the following paragraphs:

New Storyboard

This operation creates a new, empty storyboard of a given size. The parameters for this operation are:

- number of rows
- number of columns
- address of place to store the address of the new storyboard.

A pseudo-code representation of this process is provided as follows:

```
ColumnSize = #Rows * CellSize
A = SpreadsheetSize = #Columns * ColumnSize
B = ClipMarkerTableSize = MaxClipMarkers * sizeof(ClipMarkerTable entry)
C = ColumnTableSize = #Columns * sizeof(ColumnTable entry)
D = RowTableSize = #Rows * sizeof(RowTable entry)
Mem Required = A + B + C + D + sizeof(Storyboard)
Allocate the single portion of memory required for the storyboard
If unable to allocate
    return NotEnoughMemory
Set the maximum number of rows and columns
Set the number of active rows and columns
For each column:
    set the number of clip markers in the ColumnTable to 0
    set the address of the column in the ColumnTable
    For each row:
        MakeEmpty(cell)
For each row
    set the ComponentCount in the RowTable to be 0
Set ROMcardUsageTable to be NULL
Store address of new storyboard in specified location
#UnresolvedClips = 0
#UnresolvedExternals = 0
return OK
```

Clear Storyboard

This operation clears all the cells of a given storyboard by deleting all clips and clip markers from it. The parameters for this operation are:

- address of the storyboard to clear;

A pseudo-code representation of this process is provided as follows:

```
If (Storyboard is playing)
    return StoryboardPlaying
For each column from 0 to #Columns
    For each row in column
        Sub_Delete Cell
EvaluateCompleteStoryboard
return OK
```

Delete Contents Of Cell

This operation deletes the contents of a cell in the specified storyboard and frees any memory associated with any clip references that were present. The parameters for this operation are:

- address of the storyboard being used;
- row number of the cell; and
- column number of the cell.

A pseudo-code representation of this process is provided as follows:

```
If (Storyboard is playing)
    return StoryboardPlaying
ErrorCode = Get Cell Address(row, column, cell)
If (ErrorCode = OK)
    If (cell.type = Empty or ContinuationMarker)
        return CellContainsNonDeletableComponent
    Sub_Delete Cell
    ErrorCode = EvaluateStoryboard(Column)
return ErrorCode
```

Add Clip

This operation adds a clip to the specified cell. The parameters for this operation are:

- address of the storyboard being used;
- a ClipAddress structure. If ClipDirEntry is NULL, it will be filled in;
- row number of the cell; and
- column number of the cell.

A pseudo-code representation of this process is provided as follows:

```
If (Storyboard is playing)
    return StoryboardPlaying
ErrorCode = Get Cell Address(row, column, cell)
If (ErrorCode = OK)
    ec = column
    If (cell.type = CONTINUATION_MARKER)
        ec--
        Sub_SetStoppedFlag(row, ec, TRUE)
    Sub_Add Clip(Row, column)
    EvaluateStoryboard(ec)
return ErrorCode
```

Add Clip Between Cells

This operation adds a clip between the specified cells, adding a column or row or both as necessary. The parameters for this operation are:

- address of the storyboard being used;
- a ClipAddress structure (see FIG. 13). If ClipDirEntry is NULL, it will be filled in;
- row number of the first cell;
- column number of the first cell;
- row number of the second cell;
- column number of the second cell; and A pseudo-code representation of this process is provided as follows:

```
If (Storyboard is playing)
    return StoryboardPlaying
ErrorCode = InsertCell
If (ErrorCode = OK)
    ec = column
    If ((GetCellAddress(row, ec+1, next_cell) = OK) AND
        (next_cell.type = CONTINUATION_MARKER))
        ec--
        Sub_SetStoppedFlag(row, ec, TRUE)
    Sub_Add Clip(row, column)
    EvaluateStoryboard(ec)
return ErrorCode
```

Move Cell

This operation moves the contents of a particular cell to another. The parameters for this operation are:

- address of the storyboard being used;
- source row number of the cell;
- source column number of the cell;
- destination row number for the cell contents; and
- destination column number for the cell contents.

A pseudo-code representation of this process is provided as follows:

```
If (Storyboard is playing)
    return StoryboardPlaying
ErrorCode = ValidateFromCell(from_row, from_column, from_cell)
If (ErrorCode = OK)
    ErrorCode = Get Cell Address(to_row, to_column, to_cell)
If ((ErrorCode = OK) AND (to_cell != from_cell))
    If (to_cell.type = CONTINUATION_MARKER)
        Sub_SetStoppedFlag(to_row, to_column-1, TRUE)
    Sub_Delete Cell (to_cell)
    *to_cell = *from_cell
    Make_Empty(from_cell)
    IncrementRowUsage(to_row)
    DecrementRowUsage(from_row)
    if (to_cell.type = CLIP_MARKER)
        Update_CM_Entry(to_cell.cm_id, to_column)
    EvaluateCompleteStoryboard
return ErrorCode
```

Move Cell Between Cells

This operation moves the contents of a particular cell to another cell created between two cells. The parameters for this operation are:

address of the storyboard being used;

source row number of the cell;

source column number of the cell;

destination row number of the first cell;

destination column number of the first cell;

destination row number of the second cell; and destination column number of the second cell.

A pseudo-code representation of this process is provided as follows:

```
If (Storyboard is playing)
    return StoryboardPlaying
ErrorCode = ValidateFromCell(from_row, from_column, from_cell)
If (ErrorCode = OK)
    ErrorCode = InsertCell
If (ErrorCode = OK)
    If ((GetCellAddress(row, column-1, prev_cell) = OK) AND
        (cell2.type = CONTINUATION_MARKER))
        Sub_SetStoppedFlag(row, column-1, TRUE)
    If (row1 != row2) AND (row1 < from_row)
        from_row++
    If (column1 != column2) AND (column1 < from_column)
        from_column++
    ErrorCode = MoveCell(from_column, from_row, row, column)
return ErrorCode
```

Copy Cell

This operation copies the contents of a particular cell to another (only valid for clips). The parameters for this operation are:

address of the storyboard being used;

source row number of the cell;

source column number of the cell;

destination row number for the cell contents; and destination column number for the cell contents.

A pseudo-code representation of this process is provided as follows:

```
                    return Copy_Cell_To_Storyboard(this)
```

Copy Cell Between Cells

This operation copies the contents of a particular cell to another cell created between two cells. The parameters for this operation are:

address of the storyboard being used;

source row number of the cell;

source column number of the cell;

destination row number of the first cell;

destination column number of the first cell;

the destination row number of the second cell; and destination column number of the second cell.

A pseudo-code representation of this process is provided as follows:

```
If (Storyboard is playing)
    return StoryboardPlaying
ErrorCode = ValidateFromCell(from_row, from_column, from_cell)
If (ErrorCode = OK)
    ErrorCode = InsertCell
% Can copy the cell, we just must be careful about where to
If (ErrorCode = OK)
    ec = column
    If ((GetCellAddress(row, column+1, next_cell) = OK) AND
        (next_cell.type = CONTINUATION MARKER))
        ec--
        Sub_SetStoppedFlag(row, ec, TRUE)
    % Fix up from address (may have changed due to an inserted column)
    If ((row1 != row2) AND (row1 < from_row))
        from_row++
    If((column1 != column2) AND (column1 < from_column))
        from_column++
    GetCellAddress(from_row, from_column, from_cell)
    Sub_Delete Cell (to_cell)
    ErrorCode = Sub_Copy cell(from_cell, to_cell
    if (ErrorCode = OK)
        EvaluateStoryboard(ec)
return ErrorCode
```

Get Cell Contents

Figure 17:
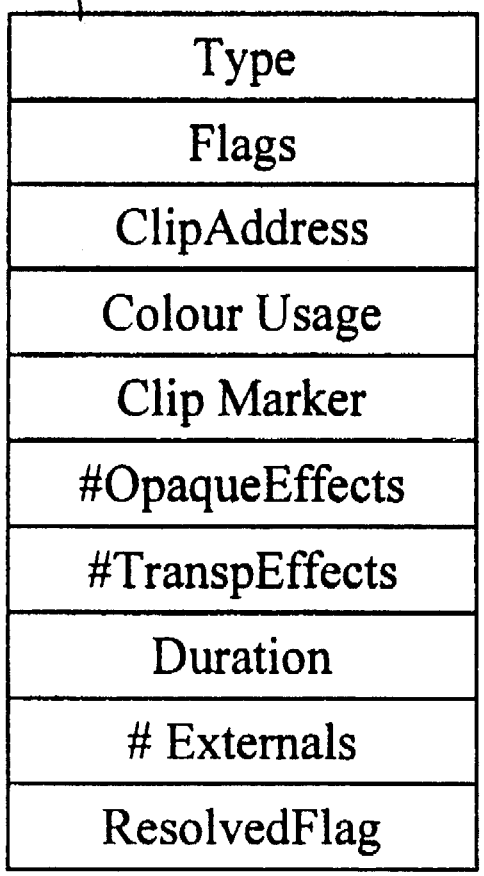
FIG. 17 illustrates the basic cell information copied in Get Cell Contents.

Referring now to FIG. 17 there is shown the basic cell information 18 copied in Get Cell Contents. Copies of the basic cell structure is made to a caller specified address. The information copied is:

Type is one of Empty, Clip, ContinuationMarker as defined previously;

Flags is the cell flags structure containing the stopped flag as defined previously;

ClipAddress indicates where to find the clip (on which ROMcard) if Type=Clip. It is invalid otherwise. The structure of the record is as defined previously;

Clip Marker. If Type=ClipMarker, it holds the clip marker ID of the cell;

ColorUsage summarizes the colorusage for the particular clip if Type=Clip. It is 0 otherwise;

OpaqueEffects summarizes the opaque effects usage for the particular clip if Type=Clip. It is 0 otherwise;

TranspEffects summarizes the transparent effects usage for the particular clip if Type=Clip. It is 0 otherwise;

Duration summarizes file duration of the clip if Type=Clip. It is 0 otherwise;

Externals indicates how many externals the clip uses; and

ResolvedFlag indicates if the clip can be run with the current ROMcard status.

The parameters for this operation are:

address of the storyboard being used;

row number of the cell;

column number of the cell; and address of location to copy the cell information.

A pseudo-code representation of this process is provided as follows:

```
ErrorCode = Get Cell Address(row, column, cell)
If (ErrorCode = OK)
    Store base components of cell from clipref at specified address
return ErrorCode
```

Get Column Level Usage

This operation returns the color and effect usage for a particular column. The parameters for this operation are:

address of the storyboard being used;

column number;

address of location to copy the color information; and address of location to copy the effect information.

A pseudo-code representation of this process is provided as follows:

```
ErrorCode = ValidateCell (Column, 0)
If (ErrorCode = OK)
    For each cell in column
        Add Effects and Color usage to total
        Store total usage in desired location
return ErrorCode
```

Validate From Cell

This operation gets the from cell's address and validates the cell type for move/copy. A pseudo-code representation of this process is provided as follows:

```
ErrorCode = GetCellAddress(from_row, from_column, from_cell)
If (ErrorCode = OK)
    If (from_cell.type = EMPTY OR CONTINUATION_MARKER)
        ErrorCode = InvalidCellType
return ErrorCode
```

Column Number From Address

A pseudo-code representation of this process is provided as follows:

```
For each entry in ColumnTable up to #Columns
    If (Column Table[entry].cells = column)
        Store column number (entry) in specified location
        return OK
return NoSuchColumn
```

Get ClipRef Address

A pseudo-code representation of this process is provided as follows:

```
ErrorCode = GetCellAddress(row, column, cell)
If (ErrorCode = OK)
    If (cell->type = Clip)
        store cell->clipref in specified location
    Else
        ErrorCode = CellDoesNotContainClip
return ErrorCode
```

Get Cell Address

A pseudo-code representation of this process is provided as follows:

```
ErrorCode = ValidateCell
If (ErrorCode = OK)
```
```
    store address of cell in specified location
    (cell address = address of (columntable[column].cells[row]))
return ErrorCode
```

Validate Cell

A pseudo-code representation of this process is provided as follows:

```
If (Column# > Max_columns)
    return ColumnOutOfRange
If (Row# > Max_rows)
    return RowOutOfRange
return OK
```

Make Empty

A pseudo-code representation of this process is provided as follows:

```
cell->type = Empty
cell->flags = 0
cell->clipref = NULL
cell->time_remaining = 0
```

Insert Cell

This operation makes sure that the cell being inserted is valid, and then inserts it into the storyboard, inserting a row, column or both if necessary. A pseudo-code representation of this process is provided as follows:

```
ErrorCode = ValidateCell(row1#, column1#)
If ErrorCode = OK
    ErrorCode = ValidateCell(row1#, column1#)
If ErrorCode != OK
    return ErrorCode
row = max(Row1#, Row2#)
min_row = min(Row1#, Row2#)
column = max(Column1#, Column2#)
min_column = min(Column1#, Column2#)
% Now validate that they are adjacent
if ((row - min_row) > 1) OR ((column - min_column) > 1))
    return CellsNotAdjacent
% Do the work
If (Column1# != Column2#)
    InsertColumn(column)
If (Row1# != Row2#)
    InsertRow(row)
store row in specified location
store column in specified location
err = GetCellAddress(row, column, cell)
return OK
```

Insert Row

This operation inserts a row at row N on all active columns within a storyboard. A pseudo-code representation of this process is provided as follows:

```
If (N > (#rows+1))
    return RowOutOfRange
If (# rows = max_rows)
    return OutOfMemory
for each active column
    for (r = max_rows-1 up to N)
        copy data from cell[r] to cell[r+1]
    set cell[r] to be Empty
% Fix up the row table. The new row inserted has no entries yet
for (r = max_rows-1 up to N)
```

```
    copy row_table[r] to row_table[r+1]
row_table[r] = 0
#rows++
return OK
```

Delete Rows

This operation deletes from R1 up to (but not including) R2 from all columns in SB. A pseudo-code representation of this process is provided as follows:

```
If (R2 > max_rows)
    return RowOutOfRange
column = columns[0]
count = max_columns
while (count)
    % first copy the data in the column (i.e. the cells)
    to = r1
    from = r2
    while (from < max_rows)
        cell[to] = cell[from]
        from++
        to++
    while (to < max_rows)
        MakeEmpty(cell[to])
        to++
    % now update the row table
    to = r1
    from = r2
    while (from < max_rows)
        row_table[to] = row_table[from]
        from++
        to++
    while (to < max_rows)
        row_table[to].count = 0
        to++
    column++
    count—
return OK
```

Insert Column

This operation inserts a column at column N. A pseudo-code representation of this process is provided as follows:

```
m = max_columns - 1
if (c >= m)
    return ColumnOutOfRange
row = 0
cell = columntable[c].cells
while (row < #rows)
    if (cell_type != Empty)
        return StoryboardTooSmall
    row++
    cell++
% Now can insert the column
tmp = columntable[m]
while (m > c)
    columntable[m] = columntable[m-1]
    m—
columntable[m] = temp
return OK
```

Delete Columns

This operation deletes columns from C1 up to (but not including) C2. A pseudo-code representation of this process is provided as follows:

```
if (c2 > max_columns)
    return ColumnOutOfRange
while (c2 > c1)
    temp = columns[c1]
    i = c1+1
    while (i < max_columns)
        columns[i-1] = columns[i]
        columns[i-1] = temp
    c2—
return OK
```

Increment Row Usage

This operation updates the usage information of a particular row. A pseudo-code representation of this process is provided as follows:

```
rowtable[row]++
```

Decrement Row Usage

This operation updates the usage of a particular row. A pseudo-code representation of this process is provided as follows:

```
rowtable[row]—
```

Compress Rows

This operation goes through all the rows deleting blank ones as necessary. At the end of processing, #rows will reflect the true number of active rows in the storyboard. A pseudo-code representation of this process is provided as follows:

```
last_active_row = -1
rows_to_move = 0
row = 0
num_rows = max_rows
while (row < num_rows)
    if (RowTable[row].count = 0)
        rows_to_move++
    else
        if (rows_to_move > 0)
            last_active_row++
            DeleteRows(last_active_row, row)
            row = last_active_row
            num_rows -= rows_to_move
            rows_to_move = 0
        else
            last_active_row = row
    row++
#rows = last_active_row + 1
```

Evaluate Storyboard

This operation evaluates all columns until the end of the storyboard is met. When column=start column for evaluations, this is corrected to be valid due to possible changes from inserting between cells. A pseudo-code representation of this process is provided as follows:

```
if (column < 0)
    column = 0
CompressRows
% See if the change was made outside the range of the active board.
% If so, delete any columns from the active_board up to the new one
if (column >= #columns)
    columns_to_move = column - #columns
    #columns++
    if (columns_to_move > 0)
        DeleteColumns(#columns, column)
    #columns++
    return OK
% Otherwise re-evaluate the storyboard from the column of change to a
```

```
% point where there is no change
last_active_column = column - 1
columns_to_move = 0
while (column < #columns)
    column_status = Evaluate_Column(column, is_active)
    switch (column_status)
    case CANNOT_INSERT:
        return StoryboardTooSmall
    case INSERTED
        #columns++
        if (#columns > max_columns)
            #columns = max_columns
            return StoryboardTooSmall
    case CHANGED:
    case NOCHANGE:
        if (! is_active)
            columns_to_move++
        if (is_active OR (column = #columns - 1))
            if (columns_to_move > 0)
                last_active_column++
                DeleteColumns(last_active_column, column)
                column = last_active_column
                #columns -= columns_to_move
                columns_to_move = 0
            else
                last_active_column = column
    if (column_status = CHANGED)
        column++
    else
        column = #columns
    column = #columns
return OK
```

Evaluate Entire Storyboard

This operation evaluates all columns until the end of the storyboard is met. A pseudo-code representation of this process is provided as follows:

```
CompressRows
column = 0
last_active_column = -1
num_cols = max_columns
while (column < num_cols)
    switch (Evaluate_Column(column, is_active))
    case CANNOT_INSERT:
        return StoryboardTooSmall
    case INSERTED:
        num_cols++
        if (num_cols > max_columns)
            num_cols = max_columns
    case CHANGED:
    case NOCHANGE:
        if (is_active)
            if (columns_to_move > 0)
                last_active_column++
                DeleteColumns(last_active_column, column)
                column = last_active_column
                num_cols -= columns_to_move
                columns_to_move = 0
            last_active_column = column
        else
            columns_to_move++
    column++
#columns = last_active_column + 1
return OK
```

Evaluate Column

This operation evaluates a particular column and set is_active flag. It assumes that the column is inactive. A pseudo-code representation of this process is provided as follows:

```
is_active = FALSE
status = UNCHANGED
min_time = INFINITE
% Get the current cell and previous column's cell
cell = columntable[column].cells
if (column = 0)
    prev_cell = blank_cell
else
    prev_cell = columntable[column-1].cells
% Now go through the cells one by one
row = 0
while (row < #rows)
    t = prev_cell->time_remaining
    % Update status if the cell had changed due to some external source
    if (cell->flags.changed)
        status = CHANGED
        cell->flags.changed = FALSE
    % Is a clip attempting to continue into this column?
    if (t > 0)
        switch (cell->type)
        case EMPTY:
            cell->type = CONTINUATION_MARKER
            cell->flags.stopped = FALSE
            cell->time_remaining = t
            min_time = min(min_time, t)
        case CLIP:
        case CLIP_MARKER:
            is_active = TRUE
            if (status = CHANGED)
                cell->flags.changed = TRUE
            err = InsertColumn(column)
            if (err = OK)
                return INSERTED
            else
                return CANNOT_INSERT
        case CONTINUATION_MARKER:
            cell->time_remaining = t
            cell->clipref = prev_cell->clipref
            min_time = min(min_time, t)
    else
    % (t <= 0)
        switch (cell->type)
        case EMPTY:
            do nothing
        case CLIP:
            cell->time_remaining = cell->clipref->duration
            min_time = min(min_time, cell->time_remaining)
        case CLIP_MARKER:
            is_active = TRUE
        case CONTINUATION_MARKER:
            Make Empty(cell)
            status = CHANGED
    fi
    % Update to be at the next cell
    cell++
    if (column > 0)
        prev_cell++
    row++
% Can now determine if the column is active (if not registered already)
if (min_time = 0)
    is_active = TRUE
If (is_active AND (min_time > 0))
% Finally go through and adjust the time of each cell by min_time
    cell = columntable[column].cells
    row = 0
    while (row < #rows)
        t = cell->time_remaining
        if (min_time = INFINITE)
            t = 0
        else
            if (t < INFINITE)
                t -= min_time
        if (cell->flags.stopped)
            t = 0
        cell->time_remaining = t
        cell++
        row++
return status
```

The foregoing can be performed on any suitably programmed computerised device such as that referred to previously by cross-reference. Accordingly, the preferred embodiment provides a means for the automatic manipulation of elements of a storyboard, including the manipulation of clips within a storyboard and the automatic placement of continuation markers to reflect the changes in timings within the storyboard.

The foregoing describes only one embodiment of the present invention. Modifications, including the implementation of the storyboard on different computer platforms in different computer programming languages, can be made thereto without departing from the scope of the present invention.

For example, although the preferred embodiment is configured for use with RTO technology, other graphics arrangements can be manipulated in corresponding ways.

We claim:

1. A method, using processing means, for updating an automated storyboard system for the creation of information sequences, wherein said storyboard comprises an array of cells arranged into columns and stored in a memory connected to the processing means, each said cell having contents that indicate a respective information source for one of the group consisting of audio information, video information and audio and video information, and each information source having a respective active duration, said method comprising, for each column of the storyboard which contains active cells, the steps of:

(a) determining which one of said cells contains an information source having a shortest one of said active durations and defining that one cell as a cell of shortest active duration, wherein the active duration of the information source of at least one of the cells is variable in relation to the active durations of the information sources of the other cells, (b) marking said column in said memory to have a column time duration of said cell of shortest active duration and terminating said information source of said cell of shortest active duration at the end of said column, and (c) where other active cells exist for said column, adding a further column next to said column, said further column containing said other active cells each having an updated active duration of their previous active duration less said column time duration.

2. A method as claimed in claim 1 further comprising the step of deleting at least one cell from said storyboard and applying said steps (a) to (c) after said deletion.

3. A method as claimed in claim 1 further comprising the step of adding at least one cell having an information source, to said storyboard and applying said steps (a) to (c) after said addition.

4. A method as claimed in claim 3 further comprising the step of adding at least one new cell between two pre-existing columns and applying said steps (a) to (c) after said addition of the new cell to create a corresponding new column.

5. A method as claimed in claim 1 further comprising the step of altering the contents of at least one of said cells and applying said steps (a) to (c) after altering said one cell.

6. A method as claimed in claim 1 further comprising the step of altering said active duration of one of said cells and then applying said steps (a) to (c).

7. A method as claimed in claim 1 further comprising the step of terminating a multiplicity of selected ones of said cells substantially simultaneously with termination of a predetermined candidate cell, said terminating step comprising the sub-steps of:

identifying a particular column of the storyboard that said information source of said predetermined candidate cell terminates; and designating said multiplicity of selected cells to terminate in said particular column, and adjusting the active duration of said selected cells to accord with the active duration of said candidate cell.

8. The method according to claim 1, wherein said video information comprises computer-generated video information.

9. Apparatus, including processing means, for updating an automated storyboard system for the creation of information sequences, wherein said storyboard comprises an array of cells arranged into columns stored in memory means connected to said processing means, each said cell having contents that indicate a respective information source for one of the group consisting of audio information, video information and audio and video information, and each information source having a respective active duration, for each column of the storyboard which contains active cells, said apparatus comprising:

means for determining which one of said cells contains an information source having a shortest one of said active durations and defining that one cell as a cell of shortest active duration, wherein the active duration of the information source of at least one of the cells is variable in relation to the active durations of the information sources of the other cells, means for marking said column in said memory means to have a column time duration of said cell of shortest active duration and terminating said information source of said cell of shortest active duration at the end of said column, and, where other active cells exist for said column, means for adding a further column next to said column, said further column containing said other active cells each having an updated active duration of their previous active duration less said column time duration.

10. The apparatus according to claim 9, wherein said video information comprises computer-generated video information.

* * * * *

UNITED STATES PATENT AND TRADEMARK OFFICE
CERTIFICATE OF CORRECTION

PATENT NO. : 5,659,792
DATED : August 19, 1997
INVENTOR : SIMON ROBERT WALMSLEY

It is certified that error appears in the above-identified patent and that said Letters Patent is hereby corrected as shown below:

COLUMN 1 line 51, "to" should read --of--;

COLUMN 3 line 24, "AVAPS's." should read --AVAPSs.--; and
line 36, "AVAPS's." should read --AVAPSs.--.

COLUMN 4 line 15, "theanimation" should read --the animation--.

COLUMN 7 line 52, "form" should read --from--.

COLUMN 8 line 62, "booleans." should read --boolean equations.--.

COLUMN 14 line 27, "to_cell" should read --to_cell)--;
line 35, "is" should read --are--; and
line 47, "colorusage" should read --color usage--.

UNITED STATES PATENT AND TRADEMARK OFFICE
CERTIFICATE OF CORRECTION

PATENT NO. : 5,659,792

DATED : August 19, 1997

INVENTOR : SIMON ROBERT WALMSLEY

It is certified that error appears in the above-identified patent and that said Letters Patent is hereby corrected as shown below:

COLUMN 15 line 32, "from"__cell" should read --from__cell)--.

COLUMN 16 line 14, "Max___rows" should read --Max___rows)--; and
line 42 ">1))" should read -->)--.

COLUMN 22 line 23, "Apparatus" should read --An apparatus--; and
line 47, "column," should read --column, and--.

Signed and Sealed this

Twenty-eighth Day of April, 1998

*Attest:*

BRUCE LEHMAN

*Attesting Officer*    Commissioner of Patents and Trademarks